United States Patent

Lopez Jimenez

Patent Number: 5,373,198
Date of Patent: Dec. 13, 1994

[54] UNINTERRUPTED ELECTRIC FEED SYSTEM WITH UNLIMITED AUTONOMY WITHOUT ELECTRIC ACCUMULATORS

[75] Inventor: Miguel Lopez Jimenez, Madrid, Spain

[73] Assignee: Investigation Tecnica Industrial, S.A., Madrid, Spain

[21] Appl. No.: 61,818

[22] Filed: May 13, 1993

Related U.S. Application Data

[63] Continuation of Ser. No. 476,959, Feb. 7, 1990, abandoned.

[30] Foreign Application Priority Data

Feb. 10, 1989 [ES] Spain .................................. 8900495

[51] Int. Cl.$^5$ .............................................. H02J 9/06
[52] U.S. Cl. ................................. 307/68; 307/44; 307/47; 307/67; 290/40 R; 290/4 D; 290/4 R
[58] Field of Search ................. 307/43, 44, 47, 64, 307/67, 68; 290/40 R, 40 B, 40 C, 4 D, 4 R, 52; 322/4, 38, 40

[56] References Cited

U.S. PATENT DOCUMENTS

| | | | |
|---|---|---|---|
| 3,283,165 | 11/1966 | Bloch | 290/4 |
| 3,675,112 | 7/1972 | Smith | 322/4 |
| 3,923,115 | 12/1975 | Helling | 180/65 A |
| 4,406,951 | 9/1983 | Inoue | 307/10 R |
| 4,460,834 | 7/1984 | Gottfried | 307/64 |
| 4,791,309 | 12/1988 | Payne | 290/40 |
| 4,827,152 | 5/1989 | Farkas | 307/68 |
| 4,857,755 | 8/1989 | Comstock | 307/47 |

FOREIGN PATENT DOCUMENTS

1953327   5/1971   Germany .
750270   6/1956   United Kingdom .

OTHER PUBLICATIONS

Krausse: "New Ways To Immediate Readiness", Elektrotechnik 67, vol. 3, Feb. 1985.

Primary Examiner—Steven L. Stephan
Assistant Examiner—Adolf Berhane
Attorney, Agent, or Firm—Darby & Darby

[57] ABSTRACT

The system ensures electric feed for which purpose it has an alternating current motor (1) coupled to an alternator (2) which is coupled to a hydraulic motor (8) which in turn is coupled to a diesel engine (7.)

The alternating current motor is coupled by means of a clutch (6) to a high pressure pump (5.)

All the elements are governed by a control circuit (4) so that in the absence of network, it simultaneously drives the diesel engine (7) and the hydraulic motor (8) the latter initially maintaining the angular speed of the alternator, until the diesel engine (7) attains its normal working conditions; as of when it is mechanically coupled to the alternator (2), the hydraulic motor (8) remaining turned off.

The high pressure pump is capable of being directly coupled to the diesel engine (7) with which the hydraulic motor (8) is the one which maintains the angular speed of the alternator (2) at all times.

4 Claims, 2 Drawing Sheets

UNINTERRUPTED ELECTRIC FEED SYSTEM WITH UNLIMITED AUTONOMY WITHOUT ELECTRIC ACCUMULATORS

This is a continuation of application Ser. No. 07/476,959, filed Feb. 7, 1990, now abandoned.

OBJECT OF THE INVENTION

As is expressed in the title of this specification, the present invention consists of an uninterrupted electric feed system whose purpose is to ensure the electric feed to all those power loads to which an interruption, although short, would involve a serious reduction of services rendered, or the risk of causing heavy economic losses or even human lives.

Its use becomes essential in the feeding of computers which operate in real time, lighting of public places especially when vapor lamps are used, hospitals, airports, communication centers, elevators, etc.

The system of the invention provides continuity with unlimited autonomy.

BACKGROUND OF THE INVENTION

Systems of application to ensure the electric feed defined in three basic levels according to the needs to be covered are conventionally known:

1. Total break and subsequent restoration in less than 30 seconds.
2. Short break or even no break but with a big deterioration of the values of the frequency and/or voltage during at least some cycles > to 20 milliseconds.
3. No break nor deterioration in the variables of frequency and/or voltage in ±1% the former and +10−8% the latter for a time less than 50 milliseconds (two and a half cycles at 50 Hz.)

The first one of them is usually solved by means of installing an emergency generating set with automatic operation, which starts up by itself in view of an absence of the public network, driving the corresponding Line-Set transfer equipment once the motor is ready to distribute its power. This entire operation must not exceed 30 seconds, and the normal thing in sets with preheating and prelubrication tends to be from 4 to 10 seconds.

The second one is a bit more complex and motor-generator-inertia wheel set, which is coupled to a diesel engine by means of an electromagnetic clutch, is used for this purpose. In normal operation the motor generator set acts as a frequency converter 50 Hz/50 Hz, (or others), the permanent power load being connected to its secondary (the generator.) The inertia wheel is kept permanently coupled to the same.

In view of an absence of the public network, the order for the start of the diesel engine is immediately produced and the engine is in the position to supply power 4 or 5 seconds after the order has been given.

During this interval of time, the inertia wheel yields part of the energy accumulated in it ($\frac{1}{2} Iw2$), which is made possible by means of the corresponding reduction of its angular speed, and therefore of the frequency of the current supplied to the power load. Depending on the size of the wheel more or less effective short-break sets can be obtained. The first ones are prohibitive due to the high degree of mechanical complexity that the handling of large wheels requires (keep in mine that the wheel must be made by forging, therefore the dimensions thereof are limited by the availability of the existing forging means) and because the high mechanical reactions make it necessary to extraordinarily reinforce the bearings.

The no-break system has only been solved up to the present by means of the use of electric accumulators. At the present time there are two methods for solving the problem: the rotary and the static ones.

The rotary one was the one initially used until 1975, as of when it has been virtually replaced by the static system up to the present. It should be pointed out that nowadays there is a certain tendency of greater confidence in the rotary systems in the most industrialized countries basically due to reasons of reliability.

The rotary system uses a controlled rectifier in order to keep the battery charged and simultaneously to provide the necessary energy to a motor-generator set.

In normal operation the energy of the public network is rectified and directed in a controlled manner to a continuous current motor to shoe shaft a three-phase alternator, which directly feeds at the "critical load", is coupled.

Is the absence of the network, the continuous current motor takes energy from the batteries keeping the rotation speed of the unit unvaried for the period of time that the size of the accumulator battery allows (normally 10 to 20 minutes.)

The static system replaces the motor-generator set of the rotary system by a three-phase (or one-phase) inverter by means of the adequate use of semiconducting power elements, either thyristors or else transistors which generate an alternating voltage whose main variables: frequency, voltage and harmonic content, have static and dynamic values which are acceptable for most of the "critical power loads."

Both systems suffer from the effect of having an autonomy limited by the size of the battery, therefore, they require the simultaneous aid of an emergency generator (normally diesel) to limit their autonomy.

The first one, although it is more reliable than the second one, requires more and more burdensome maintenance.

The problem of installations is big for both, since the battery requires certain care for its installation.

From the analysis of the foregoing paragraphs the non-existence on the market up to the present of any continuity system with limited autonomy which can be considered as a sole element or device is inferred. This is precisely the object of the present invention.

DESCRIPTION OF THE INVENTION

The present invention solves the above cited problems by ensuring the uninterrupted electric feed with unlimited autonomy.

In order to do so, the invention has an electronic control circuit which detects when an absence of electric current is produced in the network, generating an order which puts a diesel engine and a high pressure hydraulic motor in simultaneous operation.

The high pressure hydraulic motor forms parts of a hydraulic unit which collects fluid from a high pressure vessel.

Said hydraulic motor is connected by means of special couplings to the diesel engine as well as to the alternator; in such a way that as soon as a break of the electric network has been detected, the rotation of the alternator is maintained in the first moments by means of the hydraulic motor; in such a way that after a certain amount of time has gone by, that which is necessary for the diesel engine to acquire its normal working conditions, the rotation of the alternator is maintained by means of the diesel engine, by means of some special couplings, leaving the hydraulic motor inactive for the purpose of avoiding its wear and tear.

A variant that the invention has is the direct coupling of the high pressure pump to the diesel engine, with which the rotation of the alternator is maintained in the case of absence of voltage in the network constantly by means of the hydraulic motor, while the diesel motor through the pressure pump maintains the high pressure chamber from which the hydraulic motor is supplied at the pressure required for its correct working. Hence, the diesel engine will operate exclusively when it is necessary to increase the pressure of the high pressure chamber.

Hereinafter to provide a better understanding of this specification and forming an integral part of the same, a series of figures in which the object of the invention has been represented in an illustrative and non-restrictive nature are attached.

DESCRIPTION OF AN EMBODIMENT

Figure 1:
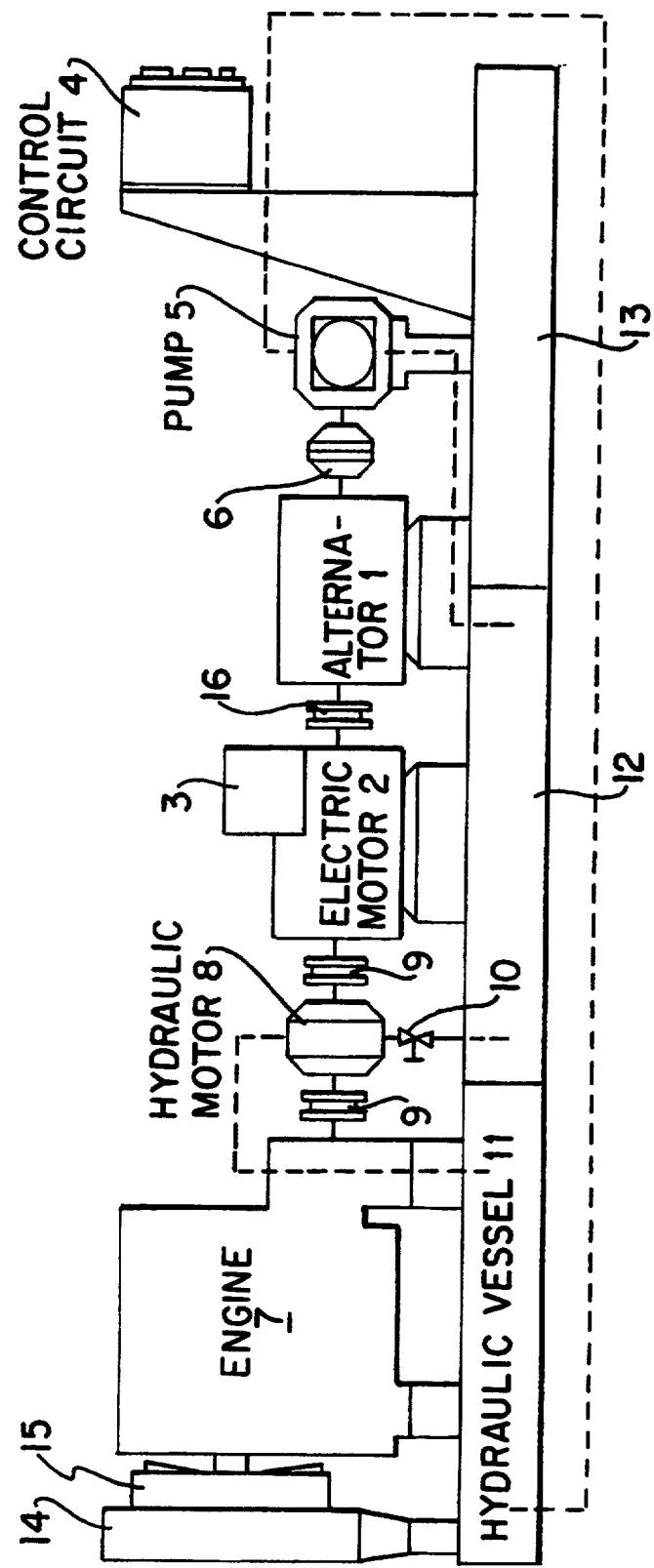
FIG. 1 shows a schematic diagram of the electric feed set object of the invention.

With regard to the commented figures, two possible embodiments made to obtain the object of the invention are described.

Hence, the invention has a three-phase alternating current electric motor 1 which is connected by means of a permanent coupling 16 to an alternator 2, with which alternating electric current with a low content of undesirable harmonics is obtained.

The voltage is maintained irrespective of the power load thanks to the regulator 3 that is built in the alternator itself 2 and which in function of the uses, will be electronic or magnetic.

The motor used is synchronous (asynchronous-synchronized) in the cases of high stability in frequency, while the motor will be asynchronous in those cases whose absolute value of the frequency in function of the power load is not an important factor.

The invention has a hydraulic motor 8 which is coupled by one side to the alternator 2 and on the other side to a diesel engine 7 by means of both special couplings 9.

The hydraulic motor 8 has a control valve 10, through which the operation of the motor is controlled.

On the other hand, the alternating current motor 1 is connected by means of an electromagnetic clutch 6 to a high pressure pump 5, for the purpose of the latter providing the pressure needed to keep the high pressure hydraulic vessel 11 ready to feed the hydraulic motor 8 when necessary.

The high pressure pump 5 is connected to a low pressure tank 11 or atmospheric tank and to a high pressure tank, just like the hydraulic motor 8, establishing the hydraulic operating circuit of the invention.

Thus, the system has an electronic control circuit 4 which detects the instant in which a break is produced in the electric supply, so that in that precise instant the opening of the valve 10 and the start of the diesel engine 7 are effected simultaneously. Hence, it obtains that in a first instant the angular speed of the alternator is kept constant during the necessary interval of time so that the diesel engine 7 is ready to distribute the power required to the unit, in other words, the interval of time in which the diesel engine 7 reaches its normal working conditions.

At this moment the action of the hydraulic motor 8 disappears and is replaced by that of the diesel engine 7 which at that precise instant remains mechanically clutched to the alternator 2, acting as of then as a precision electric generator.

Upon the return of the public network, the electronic circuit 4 waits a certain time to ensure that the quality of the electric supply is the ideal one, thus permitting again the connection of the public network in phase with the electric motor, then disconnecting the diesel engine and returning the system to the normal operation.

The diesel engine 7 has the corresponding cooling system formed by the radiator 14 and the ventilator 15.

The hydraulic circuit of the invention has been specified in the figures by means of dash lines.

In normal operation, the hydraulic fluid high pressure pump 5 is circumstantially coupled by means of the electro-magnetic clutch 6 to the shaft of the motor 1, taking fluid from the low pressure vessel 11 and sending it at high pressure to the high pressure vessel 12, raising the same until the corresponding pressure switch deactivates the clutch.

The high pressure tank is designed in such a way that its air content at initial pressure makes it possible to store enough liquid under pressure make it possible to keep the required flow and pressure so that through the hydraulic motor 8 the energy needed to keep the motor alternator set turning for about one minute is produced.

In view of an absence of the electric network, just as it has been indicated above, the control circuit 4' generates an order to operate the valve 10 consisting of a servovalve, so that the hydraulic motor 8 is driven in conjunction with which the alternator 2 maintains the rotation speed for the necessary time so that the diesel engine which has received a simultaneous starting order has started and is ready to furnish the required energy (foreseeably between 4 and 10 seconds.)

The hydraulic motor 8 is not kept continuously rotating, but rather only for the period of time during which the diesel engine is supplying power for the purpose of avoiding premature wear and tear of the hydraulic motor.

The coupling of the hydraulic motor to the motor or alternator set is effected by means of a special coupling 9 consisting of a device which combines the viscous effect and other elastic coupling devices.

Figure 2:
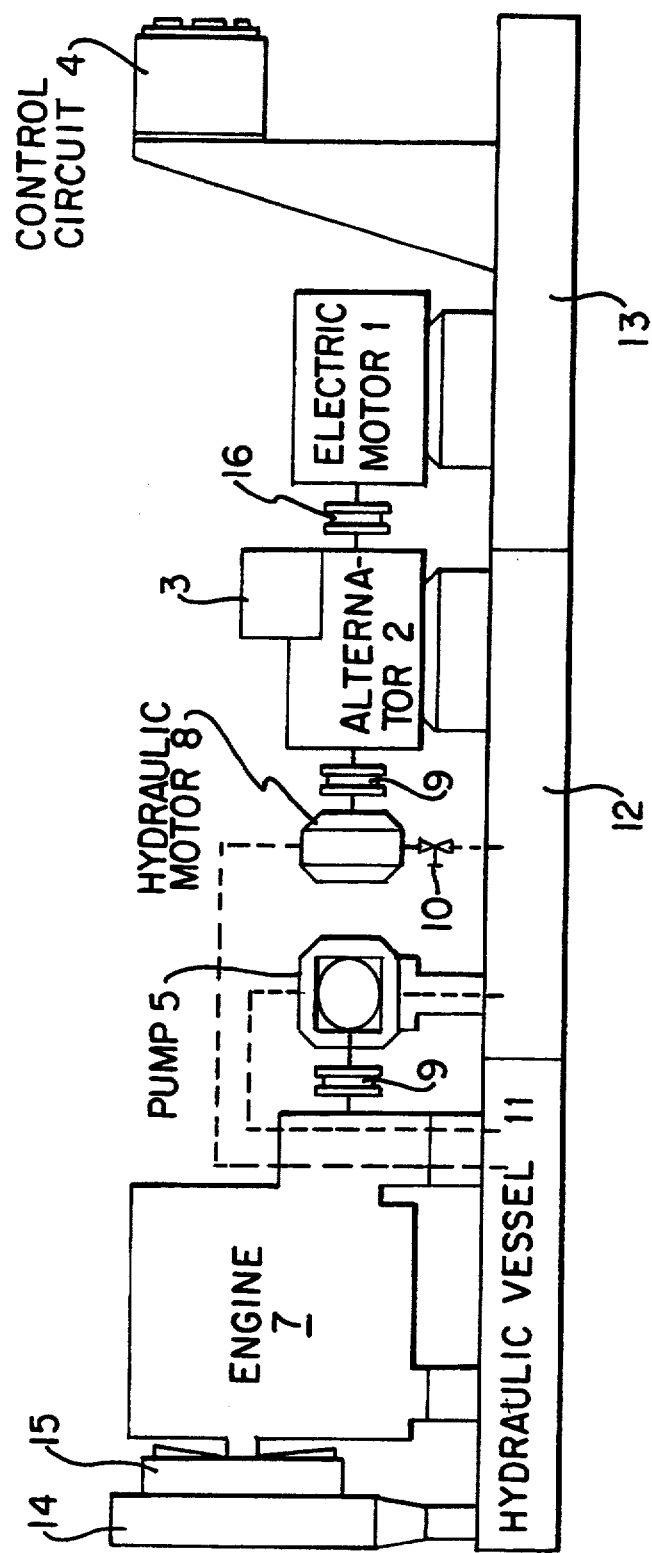
FIG. 2 shows a schematic diagram which represents variants with regard to the electric feed set represented in the above figure.

The other possible embodiment consists of keeping the high pressure hydraulic pump rigidly coupled to the diesel motor (FIG. 2), in which case its sizing will be the one corresponding to the total power, in other words, much larger than the dimensioning required when said pump is coupled to the alternating current motor 1 (FIG. 1.)

In this second case the transmission of the energy is done from the diesel engine to the alternator by means of hydraulic conduits which connect the inlet of the hydraulic pump 5 to the low pressure vessel 11 and the pressure duct of the same to the high pressure tank 12, all of this represented in a dash line.

In this case the diesel engine 7 starts and stops when it is necessary to ensure the maintenance of enough pressure in the high pressure tank 12 and therefore enough accumulated energy to be used while the diesel engine starts and begins to supply power on its part.

Therefore, in this second case in the instant in which the control circuit 4 detects and breaks the electric supply, the valve 10 is activated establishing the operation of the hydraulic motor 8 which maintains the constant rotation of the alternator 2 by means of the special coupling 9.

On its part, the diesel engine 7 will be kept operating as long as it is necessary to increase the pressure of the high pressure tank 12 which facilitates the correct operation of the hydraulic motor 8.

Therefore, in this second case, it is the hydraulic motor 8 which supplies the energy needed to maintain a constant rotation of the alternator 2, while the diesel engine 7 operates when it is necessary to increase the pressure in the high pressure tank 12.

In this second case as well as in the first case, all of the described elements are mounted on a bed which has, integrated in the same, the high pressure and low pressure tanks 12 and 11 respectively, as well as the gas-oil tank 13.

The control circuit 4 can be formed by means of a micro-provessor which as was indicated above, controls the different functions of starting, stopping and coordinating the different elements, for the purpose of avoiding the rotation angular speed of the motor-alternator set from enduring any modification, during the presence, as well as during the absence of the public electric network.

Likewise, the control circuit is capable of incorporating a remote control panel and/or remote indication of operation panel, either by discrete cable or else by a standard RS-232, RS-422 microprocessor communication line or another particular mode of communication, either with the remote control itself or with an external computer network.

The entire system can be mounted on a single frame or one divided in two mechanically independent parts coupled by hydraulic and electric circuits.

In both cases it can be surrounded by a soundproof fuselage, as well as being mounted on a motorized bedding.

I claim:

1. An uninterruptible electric feed system, comprising:
   an electric motor adapted to be powered by an external power source;
   an alternator connected so as to be mechanically driven by said electric motor;
   a hydraulic motor coupled to mechanically drive said alternator;
   a high-pressure fluid tank having fluid therein, said high-pressure fluid tank connected to said hydraulic motor;
   valve means connected to said high-pressure tank actuable to connect said high-pressure tank to said hydraulic motor such that said hydraulic motor is driven only by fluid from said high-pressure tank;
   a low-pressure tank connected to said hydraulic motor for receiving fluid therefrom;
   a hydraulic pump adapted to draw fluid from said low-pressure tank and to provide fluid at high pressure to only said high-pressure tank;
   a diesel engine connected to mechanically drive only said hydraulic pump;
   a control circuit jointly responsive to said external power source and the pressure in said high-pressure tank, said circuit controlling said diesel engine to drive said hydraulic pump and increase the pressure in said high-pressure tank when said pressure drops below a predetermined level; and
   a support bed on which said motors, said alternator, said valve means, said pump, and said engine are located.

2. An uninterruptible electric feed system according to claim 1, further comprising a fuel tank for supplying fuel to said diesel engine, wherein said high-pressure tank, said low-pressure tank and said fuel tank are incorporated within said support bed.

3. An uninterruptible electric feed system according to claim 2, wherein said control circuit actuates said valve means to connect said high-pressure tank to said hydraulic motor to maintain the rotational speed of the alternator upon detecting the absence of said external power source.

4. An uninterruptible electric feed system according to claim 3, wherein the system is mounted on a motorized bed.

* * * * *

UNITED STATES PATENT AND TRADEMARK OFFICE
CERTIFICATE OF CORRECTION

PATENT NO. : 5,373,198
DATED : December 13, 1994
INVENTOR(S) : Miguel Lopez JIMENEZ It is certified that error appears in the above-indentified patent and that said Letters Patent is hereby corrected as shown below:

Title page: [73] Assignee:, change "Investigation" to --Investigacion--.

Signed and Sealed this

Seventh Day of March, 1995

Attest:

BRUCE LEHMAN

Attesting Officer

Commissioner of Patents and Trademarks